(12) United States Patent
Simmons et al.

(10) Patent No.: US 6,197,077 B1
(45) Date of Patent: Mar. 6, 2001

(54) FILTER SCREEN ASSEMBLY FOR MOUNTING OVER AN AIR INTAKE OPENING

(76) Inventors: Jesse Kenneth Simmons; Maralyne J. Simmons, both of 4030 Sleeth Rd., Milford, MI (US) 48382

( * ) Notice: Subject to any disclaimer, the term of this patent is extended or adjusted under 35 U.S.C. 154(b) by 0 days.

(21) Appl. No.: 09/324,434

(22) Filed: Jun. 1, 1999

(51) Int. Cl.[7] .................................................. B01D 46/00
(52) U.S. Cl. .................................. 55/351; 55/354; 55/491
(58) Field of Search ............................ 55/351, 353, 354, 55/478, 480, 490, 491, 495, 511; 95/273

(56) References Cited

U.S. PATENT DOCUMENTS

| | | | |
|---|---|---|---|
| 187,894 | * 2/1877 | Osggod | 55/351 |
| 2,521,455 | * 9/1950 | Gorgun | 55/351 |
| 3,695,008 | 10/1972 | Neumann | 55/354 |
| 4,347,885 | 9/1982 | Von Knorring et al. | 160/242 |
| 4,894,071 | * 1/1990 | Klein | 55/351 |
| 5,370,722 | 12/1994 | Simmons | 55/351 |
| 5,529,593 | 6/1996 | Simmons | 55/354 |
| 5,560,120 | 10/1996 | Swanson et al. | 55/320 |

* cited by examiner

Primary Examiner—Duane S. Smith
(74) Attorney, Agent, or Firm—Gifford, Krass, Groh, Sprinkle, Anderson & Citkowski, P.C.

(57) ABSTRACT

A filter screen assembly for mounting over an air intake opening of a structure. The structure has a height, a width and a depth and defines a selected face within which the air intake opening is formed. The selected face further includes a top, a bottom, a first side and a second side surrounding the intake opening. A planar and flexible filtration screen defines a substantially rectangular shape with by a top edge, a bottom edge, a first side edge and a second side edge. Fasteners are provided for securing at least first and second sides of the screen to corresponding sides of the intake structure and include eyelets formed within the screen which are supported upon tubular portions extending from the structure and fasteners which secure within the tubular portions to affix the screen in place.

10 Claims, 4 Drawing Sheets

FILTER SCREEN ASSEMBLY FOR MOUNTING OVER AN AIR INTAKE OPENING

BACKGROUND OF THE INVENTION

1. Field of the Invention

The present invention relates generally to filter assemblies and, more particularly, to a flexible filter screen assembly which is capable of being securably attached over an air intake opening of an air filtration, treatment or intake structure of conventional design.

2. Description of the Prior Art

Filtration assemblies are known in the art which can be used in conventional cooling towers and like structures. Normally, such filter assemblies are used for filtering particles from a coolant flow within the cooling tower.

An example of a filtering assembly for an air intake is disclosed in U.S. Pat. No. 5,370,722, issued to Simmons, and which shows a flexible screen positioned to cover an opening of the air intake. The screen includes a top, bottom and first and second side walls and also provides a container located at the base of the structure beneath the intake opening for storing the flexible screen when not in use. A pulley arrangement is provided and which includes cables extending in parallel fashion and in proximity to the first and second sides of the flexible screen. The cables engage the respective sides of the screen by virtue of O-rings which are also secured within eyelets formed along the edges of the sides of the screen and so that the screen may be slidably guided during raising and lowering. An alternate embodiment of the Simmons '722 reference discloses first and second containers secured in parallel extending and opposing arrangement over ends of the air intake opening. A continuous roll of flexible screen material extends between first unused and second used rolls contained in the first and second containers, respectively. An unused portion of the screen is unrolled and advanced over the opening by rotating a crank associated with a selected container and replaces a previously unrolled and used portion which is subsequently rewound onto the second roll.

An additional example of a prior art filtration assembly is disclosed in U.S. Pat. No. 3,695,008, issued to Neumann. The Neumann reference teaches a roller-strip filter for air or gas purification and which, similarly to the second embodiment of the Simmons '722 reference, teaches first and second units for holding feed and wind up rollers for advancing a filter screen.

SUMMARY OF THE PRESENT INVENTION

The present invention is a filter screen assembly for mounting over an air intake opening of a structure. The structure has a height, a width and a depth and defines a selected face within which the air intake opening is formed, the selected face including a top, a bottom, a first side and a second side surrounding the intake opening.

The filter screen assembly includes planar and flexible filtration screen having a substantially rectangular shape and defined by a top edge, a bottom edge, a first side edge and a second side edge. A top edge of the screen is capable of being suspended in one preferred embodiment from a corresponding top of the air intake structure hook portions. Additional weighted rods function as stiffening and tensioning members and are capable of being inserted within first and second sleeves formed along the corresponding top and bottom edges of the screen.

Fasteners are provided for securing, in one embodiment, first and second side edges of the screen to the first and second sides of the intake opening as an additional feature to the suspending hook portions. The fasteners include eyelets which receive therethrough correspondingly positioned tubular portions extending from intake structure when the screen is applied over the intake opening. Mounting screws are engaged within open facing ends of the tubular portions, the screws each including an enlarged head which abuts against the portions of the screen encircling the eyelets and prevents disengagement of the screen from the intake structure. In an alternative embodiment, the fasteners are provided to the exclusion of the suspending hook portions and may secure the screen to the intake structure on the opposite sides of the intake opening or may extend along the top along or top and bottom of the opening.

In a further embodiment, a storage container may also be positioned proximate a side of the structure adjacent the opening, such side preferably being the bottom but possibly also a side or top. The container includes a bottom and a pair of side walls which define an open interior for receiving the screen and a lid hingedly connected to one of the side walls of the container.

BRIEF DESCRIPTION OF THE DRAWING

Reference will now be had to the attached drawings, when read in combination with the following specification, wherein like reference numerals refer to like parts throughout the several views, and in which.

DESCRIPTION OF THE PREFERRED EMBODIMENT

Figure 1:
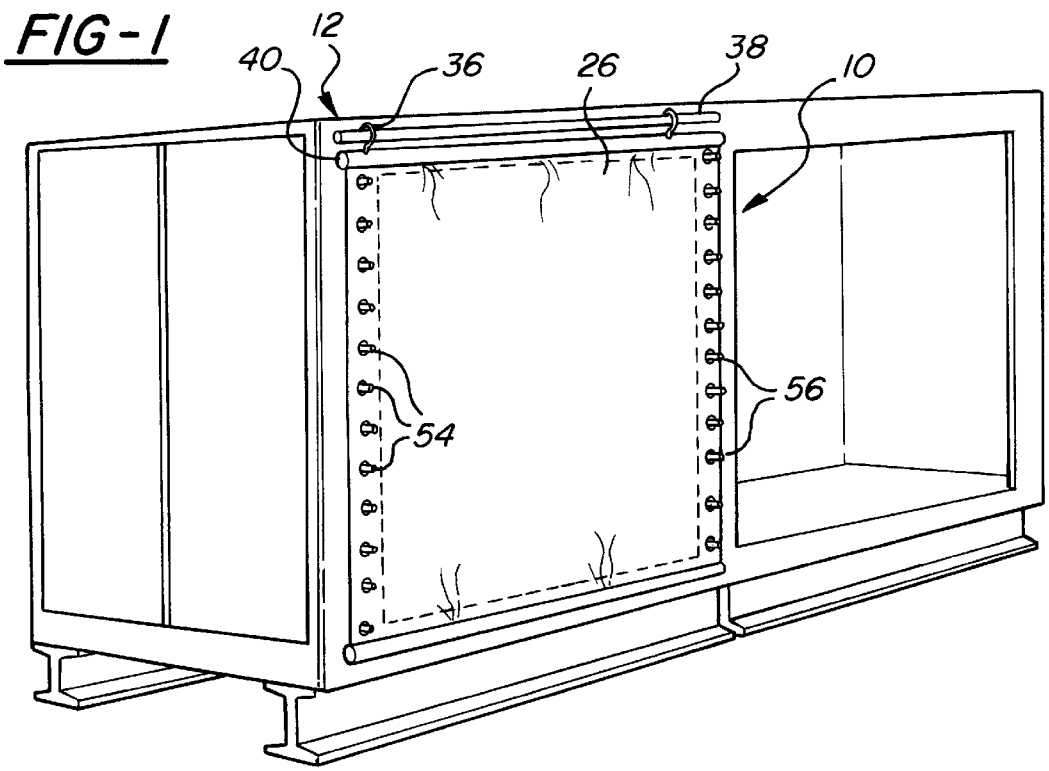
FIG. 1 is a perspective view of a first preferred embodiment of the filter screen assembly according to the present invention.
Figure 2:
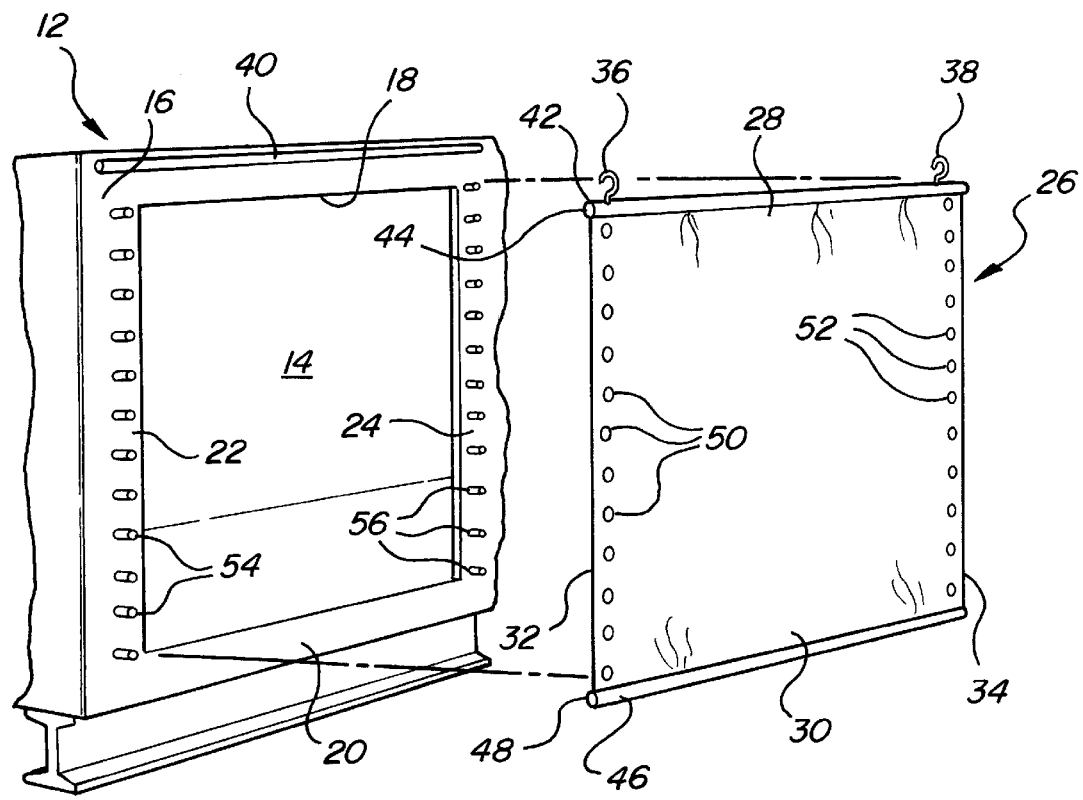
FIG. 2 is an exploded view in partial section of the embodiment shown in FIG. 1.
Figure 3:
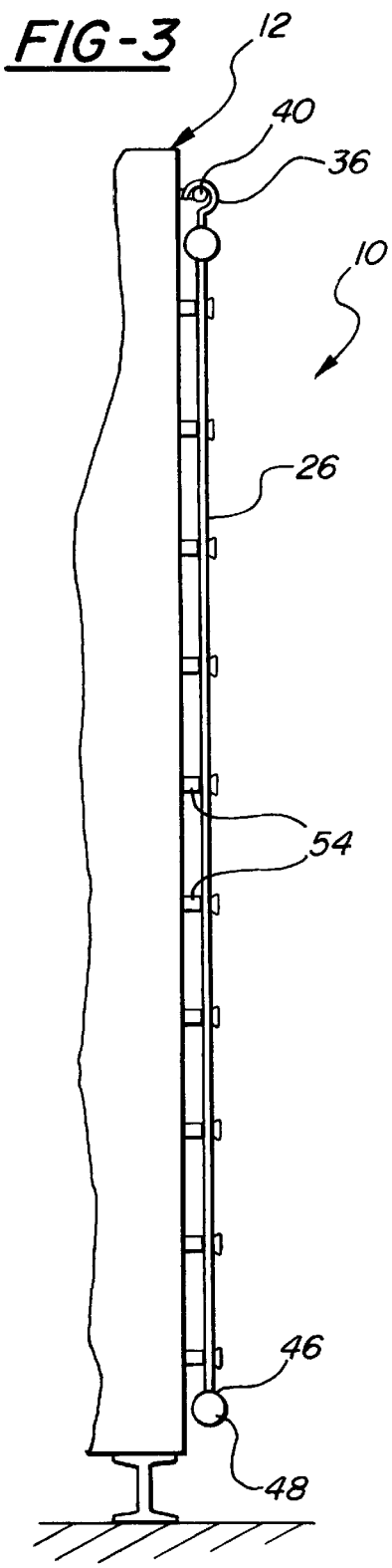
FIG. 3 is a side view of the filter screen assembly and air intake structure illustrated in FIG. 1.

Referring to FIG. 1, a first preferred embodiment of the filter screen assembly is illustrated at 10 according to the present invention for covering an air intake. The filtering assembly is capable of being used with any air intake system, but is preferably used with cooling towers, building louvers, air handling units and the like. For illustration, a cooling tower structure 12 is shown having an intake opening 14 (see FIG. 2). The structure includes a height, width and depth which defines a selected face 16 surrounding the intake opening 14 and including a top 18, a bottom 20, a first side 22 and a second side 24.

A planar and flexible filtration screen 26 is provided as the filtering element for the filter assembly 10. The screen 26 is constructed of a lightweight screening material and is preferably a polyester fabric or wire mesh material. The screen 26 is preferably rectangular and defined by a top edge 28, a bottom edge 30, a first side edge 32 and a second side edge 34. The screen 26 is particularly useful for filtering out cotton wood pollen, insects, leaves and the like prior to their being drawn into the air intake 14 of the cooling tower 12 or like structure.

Referring again to FIGS. 1 and 2, and also to FIG .3, the screen 26 includes a pair of hook portions 36 and 38 which extend from the top edge 28 and which securable upon an engaging bar 40 which is mounted in horizontally extending fashion along the top 18 of the air intake structure 12. The engaging bar 40 is one type of structure which can be employed for use with the suspending hooks 36 and 38, with other suitable engagement members capable of being utilized. The hook portions 36 and 38 can also include belt-type fasteners with clasp and lock members or any other suspending member capable of supporting the flexible screen 26 in overlaying fashion across the intake opening 14.

Figure 4:
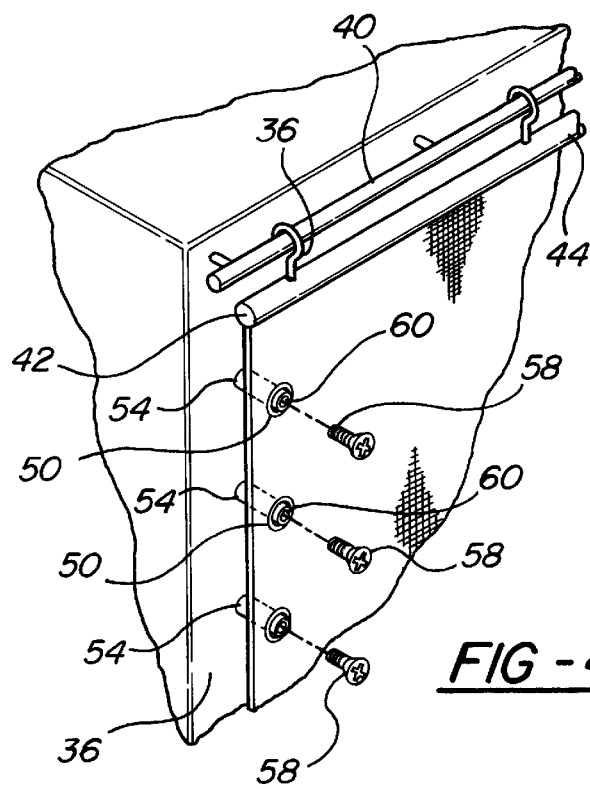
FIG. 4 is a further exploded view in partial section and illustrating the manner in which the fasteners secure the eyelets to the tubular portions extending from the intake structure according to the present invention.

The flexible screen 26 according to the first preferred embodiment also includes a first sleeve 42 at the top edge 28 within which is inserted a first bar 44 (see FIG. 4) which provides the function of tensioning and stiffening the upper end of the screen 26. Also provided along the bottom edge 30 is a second sleeve 46 within which is inserted a second bar 48 for providing weighting to the bottom of the screen 26 and to tension and stiffen the lower end of the screen 26. As shown in FIG. 4, the first bar 44 for insertion into the first sleeve 42 (and representative of the identical second bar 48) is typically a hollow metal tube of sufficient weight and mass to provide adequate stiffening to the overall screen assembly.

Fasteners are disclosed for use with the screen assembly, additional to the suspending mechanism according to the first preferred embodiment, and includes pluralities of eyelets 50 and 52 which are spaced apart and which extend in inwardly spaced manner proximate to the first and second side edges 32 and 34, respectively, of the flexible screen 26. The eyelets 50 and 52 each typically include an annular ring of metal or heavy duty nylon to prevent tearing of the surrounding fabric structure and receive therethrough in correspondingly positioned fashion associated pluralities of tubular portions 54 and 56 which extend, respectively, from the first and second sides 22 and 24 of the air intake structure 12 when the screen 26 is applied over the intake opening 14.

Figure 5:
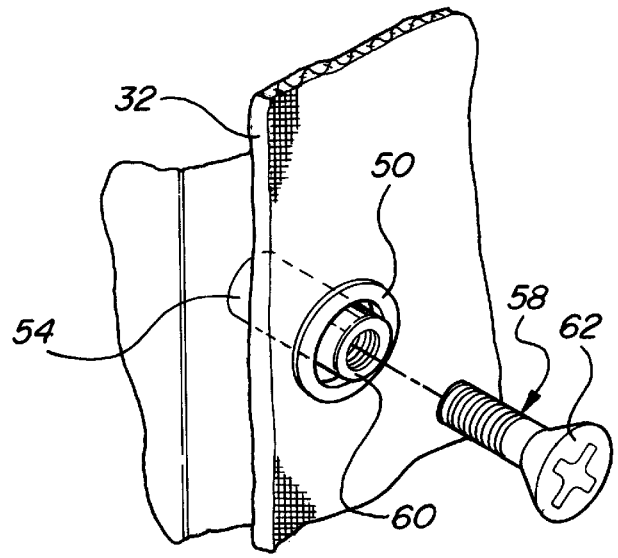
FIG. 5 is an enlarged portion of FIG. 4 and illustrating a particular fastener engaging an eyelet to a tubular portion.

Pluralities of mounting screws, see at 58 in FIGS. 4 and 5, are engaged within open facing ends 60 of the tubular portions 54 and 56. The mounting screws 58 include enlarged heads 62 (see again FIG. 5) which, upon engagement of the screws 58, secure the respective pluralities of eyelets 50 and 52 upon the tubular portions 54 and 56.

Figure 8:
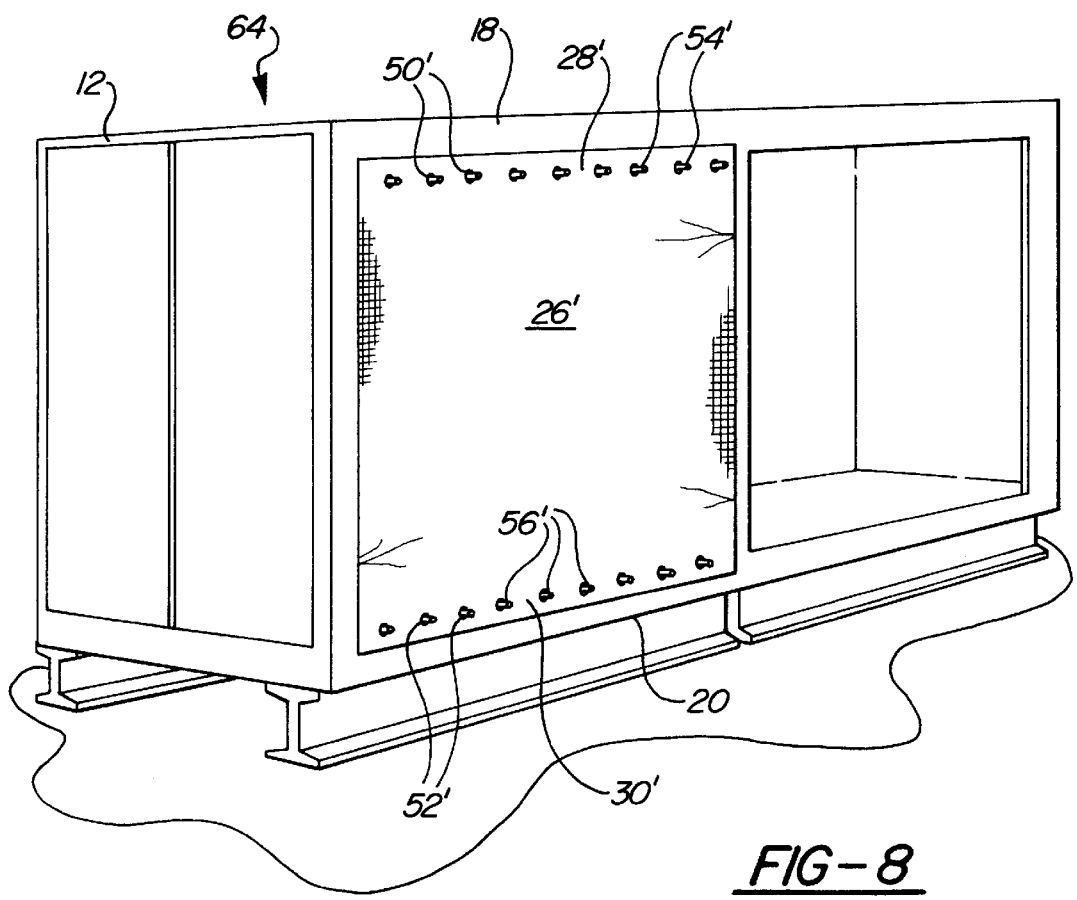
FIG. 8 is a perspective view of a second preferred embodiment of the filter screen assembly according to the present invention.

Referring further to the alternate embodiment set forth in FIG. 8 at 64, a variant of the flexible screen 26' is secured to the air intake structure 12 by means of first and second pluralities of eyelets 50' and 52' which extend, respectively, across the top edge 28' and bottom edge 30' of the screen 26' and which are engaged by correspondingly positioned tubular portions 54' and 56' with attached screw fasteners and which likewise extend along the top 18 and bottom 20 sides of the intake structure 12 surrounding the air intake opening. The fasteners in this embodiment can replace entirely the use of the suspending hooks 36 and 38 and bar 40 and the stiffening bars 42 and 46. Alternatively, the pluralities of eyelets and engaging tubular members may extend only along the top edge, along only the first and second side edges, and/or may be utilized selectively with the suspending hooks and one or more stiffening inserts located selectively at the top, bottom, top and bottom, and/or first or first and second side edges of the screen.

Figure 6:
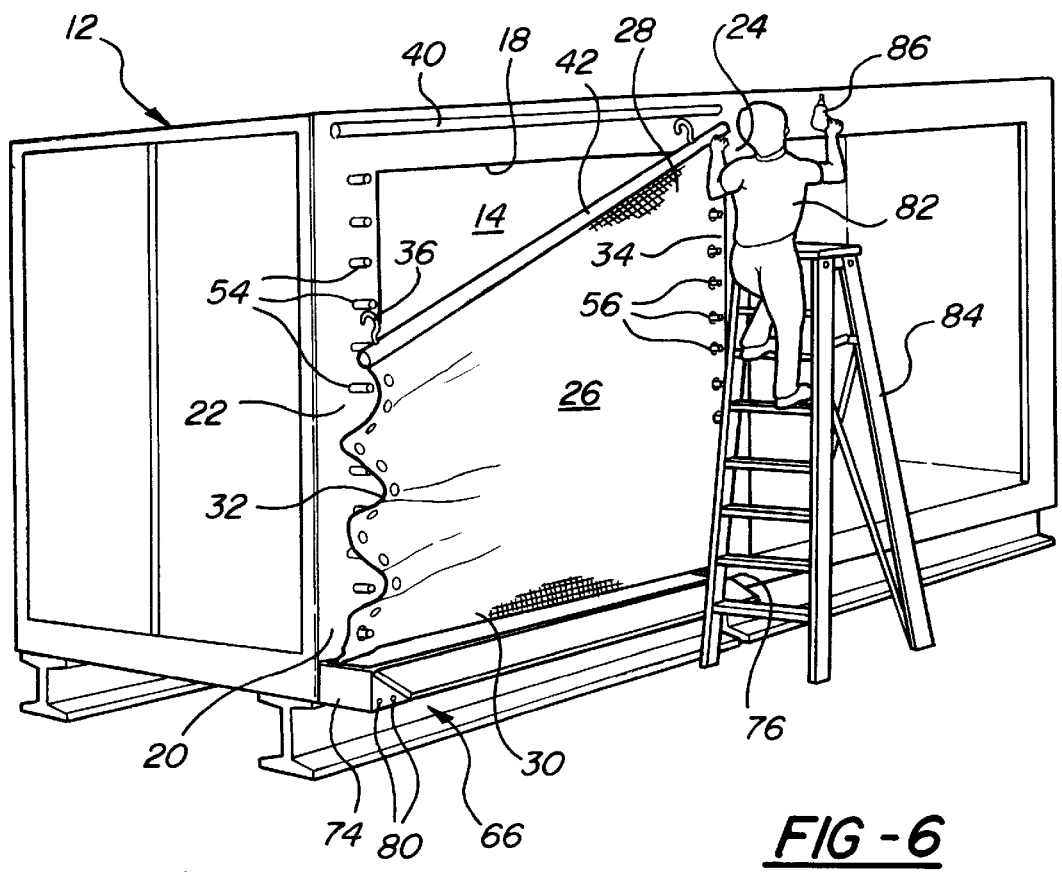
FIG. 6 is a further environmental view similar to that shown in FIG. 1 and illustrating the screen assembly being dismounted from the air intake structure.
Figure 7:
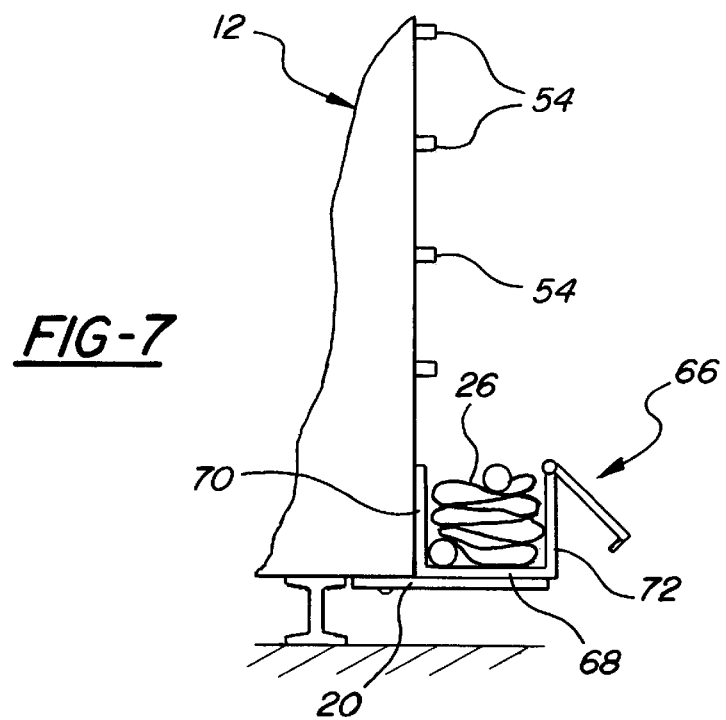
FIG. 7 is a side cutaway taken along line 7—7 of FIG. 6 and illustrating the filter screen assembly in a stored position within the container mounted to the base of the structure.

Referring again to FIG. 6, and also to FIG. 7, a container 66 for storing the flexible screen 26 is secured to the air intake structure 12 contiguous to its bottom edge 20. The container 66 has a bottom 68, a first side wall 70, a second side wall 72 and end walls 74 and 76 (see FIG. 6) which define an open interior. A lid 78 is hingedly attached to the second side wall 72 and can be selectively opened and closed to reveal the inside of the container 66. Additionally, a plurality of holes 80 may be formed at or near the bottom 68 of the container 68 to drain moisture collected within the container.

Referring again to FIG. 6, the screen 26 can be conveniently lowered and stored within the container 66 when it is desirable to gain access to the air intake 14 of the structure 12. This is typically accomplished by an individual 82 standing on a ladder 84 or other elevating structure and progressively removing the screw fasteners to permit disengagement of the eyelets 50 and 52 of the screen 26 from the corresponding tubular portions 54 and 56 secured to the air intake structure. Typically, a powered screwdriver 86 or like tool is utilized to accomplish quick removal of the fasteners. The top edge 28 of the screen 26 may then be removed from the air intake structure by disengaging the hook portions 36 and 38 from the elongate bar 40 or like supporting member and then placing the screen 26 into the container (as again shown in FIG. 7) when not in use.

Accordingly, the present invention provides a novel and unique assembly for protecting the air intake of any desired structure. Having described my invention, additional embodiments will become apparent to those skill in the art to which it pertains. Specifically, a plurality of screens can be used for covering a like plurality of intake openings arranged on a structure, such as is shown in FIG. 1 and for which only one such screen assembly is illustrated. Finally, the screens can also be placed on the inside of an intake opening, rather that on the outside as is shown in the drawings.

We claim:

1. A filter screen assembly for mounting over an air intake opening of a structure, the structure having a height, a width and a depth and defining a selected face within which the air intake opening is formed, the selected face including a top, a bottom, a first side and a second side surrounding the intake opening, said filter screen assembly comprising:

a planar and flexible filtration screen having a substantially rectangular shape defined by a top edge, a bottom edge, a first side edge and a second side edge;

suspending means extending from the top of the selected face of the structure and engageable with said top edge of said screen for supporting said screen over the opening; and fastening means for securing said first and second side edges of said screen to the first and second sides of the intake opening, said fastening means further comprising first and second pluralities of spaced apart eyelets extending in inwardly spaced and proximate fashion along said first and second side edges, respectively, of said filtration screen, said eyelets receiving therethrough correspondingly positioned tubular portions extending from the first and second sides of the air intake structure when said screen is applied over the intake opening, said fastening means further comprising mounting screws which are engaged within open facing ends of said tubular portions, said mounting screws including enlarged heads which secure said eyelets upon said tubular portions.

2. The filter screen assembly as described in claim 1, an engaging bar extending from the top of the air intake structure, said suspending means further comprising hook portions extending from said top edge of said screen which are securable upon said engaging bar.

3. The filter screen assembly as described in claim 2, further comprising a first sleeve formed along said top edge of said screen and receiving a first tensioning and stiffening bar.

4. The filter screen assembly as described in claim 3, further comprising a second sleeve formed along said bottom edge of said screen and receiving a second tensioning and stiffening bar.

5. The filter screen assembly as described in claim 1, further comprising means for storing said screen attached to the structure.

6. The filter screen assembly as described in claim 5, said means for storing said screen comprising a container positioned proximate the bottom of the structure, said container having a bottom and a pair of side walls defining an open interior for receiving said screen and having a lid hingedly connected to one of said side walls.

7. The filter screen assembly as described in claim 5, further comprising a plurality of holes formed in said bottom of said container to drain moisture collecting within said container.

8. The filter screen assembly as described in claim 1, wherein said screen is constructed of a polyester material.

9. The filter screen assembly as described in claim 1, wherein said screen is constructed of a wire mesh material.

10. A filter screen assembly for mounting over an air intake opening of a structure, the structure having a height, a width and a depth and defining a selected face within which the air intake opening is formed, the selected face including a top, a bottom, a first side and a second side surrounding the intake opening, said filter screen assembly comprising:

a planar and flexible filtration screen having a substantially rectangular shape defined by a top edge, a bottom edge, a first side edge and a second side edge; and fastening means for securing at least first and second selected edges of said screen to corresponding sides of the intake opening, said fastening means further including at least first and second pluralities of spaced apart eyelets extending in inwardly spaced and proximate fashion along said first and second selected edges, respectively, of said filtration screen, said eyelets receiving therethrough correspondingly positioned tubular portions extending from the air intake structure when said screen is applied over the intake opening, said fastening means further comprising mounting screws which are engaged within open facing ends of the tubular portions, said mounting screws including enlarged heads which secure said eyelets upon the tubular portions.

* * * * *